(12) United States Patent
McGehee

(10) Patent No.: US 7,585,104 B2
(45) Date of Patent: Sep. 8, 2009

(54) ROTARY PROCESSOR

(75) Inventor: James F. McGehee, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 681 days.

(21) Appl. No.: 11/224,176

(22) Filed: Sep. 12, 2005

(65) Prior Publication Data
US 2007/0058486 A1    Mar. 15, 2007

(51) Int. Cl.
*B01F 9/02* (2006.01)
(52) U.S. Cl. ................................ 366/228; 366/235
(58) Field of Classification Search ............... 366/57, 366/58, 220, 225, 228, 235
See application file for complete search history.

(56) References Cited

U.S. PATENT DOCUMENTS

| | | | | | |
|---|---|---|---|---|---|
| 71,448 | A | * | 11/1867 | Bruckner | 366/220 |
| 215,562 | A | * | 5/1879 | Blythe et al. | 366/228 |
| 513,925 | A | * | 1/1894 | Harton | 366/147 |
| 1,052,628 | A | * | 2/1913 | Thompson | 366/58 |
| 1,867,541 | A | * | 7/1932 | Shellabarger | 426/507 |
| 3,381,944 | A | * | 5/1968 | Clary | 366/220 |
| 3,588,052 | A | * | 6/1971 | Scholtz | 366/228 |
| 4,064,112 | A | | 12/1977 | Rothe et al. | 260/75 M |
| 4,199,371 | A | | 4/1980 | Regnault et al. | 127/37 |
| 4,403,865 | A | * | 9/1983 | Fejmert | 366/44 |
| 4,460,762 | A | | 7/1984 | Gaymans et al. | 528/335 |
| 5,020,916 | A | | 6/1991 | Fritsch | 366/97 |
| 5,397,179 | A | | 3/1995 | Berlin et al. | 377/337 |
| 5,540,868 | A | | 7/1996 | Stouffer et al. | 264/13 |
| 5,633,018 | A | | 5/1997 | Stouffer et al. | 425/8 |
| 5,708,124 | A | | 1/1998 | Al Ghatta et al. | 528/308.3 |
| 5,744,074 | A | | 4/1998 | Stouffer et al. | 264/8 |
| 5,779,986 | A | | 7/1998 | Van Endert et al. | 422/136 |
| 2004/0103842 | A1 | * | 6/2004 | Chisholm et al. | 118/13 |

FOREIGN PATENT DOCUMENTS

WO   WO 00/23497 A1   4/2000
WO   WO 2004/018541 A1   3/2004

OTHER PUBLICATIONS

"Nylon 6 Polymerization in the Solid State" by R.J. Gaymans et al, Journal of Applied Polymer Science, vol. 27, 2513-2526 (1982).
"Forces on Bins: The Effect of Random Friction" by E.B. Pitman, The American Physical Society, Mar. 1998, Physical Review E, vol. 57, No. 3, pp. 3170-3175.
"Continuous Mixing of Fluids" by H. Henzler, Chapter 7, Ullmann's Encyclopedia of Industrial Chemistry, 2002.

* cited by examiner

*Primary Examiner*—David L Sorkin
(74) *Attorney, Agent, or Firm*—James C Paschall; David J Piasecki

(57) ABSTRACT

The present invention provides an apparatus for increasing the intrinsic viscosity of a polymer. The apparatus includes a rotary kiln with internal walls for delaying progress of the polymer to the exit of the kiln to be subject to sufficient processing to obtain desirable intrinsic viscosity.

20 Claims, 3 Drawing Sheets

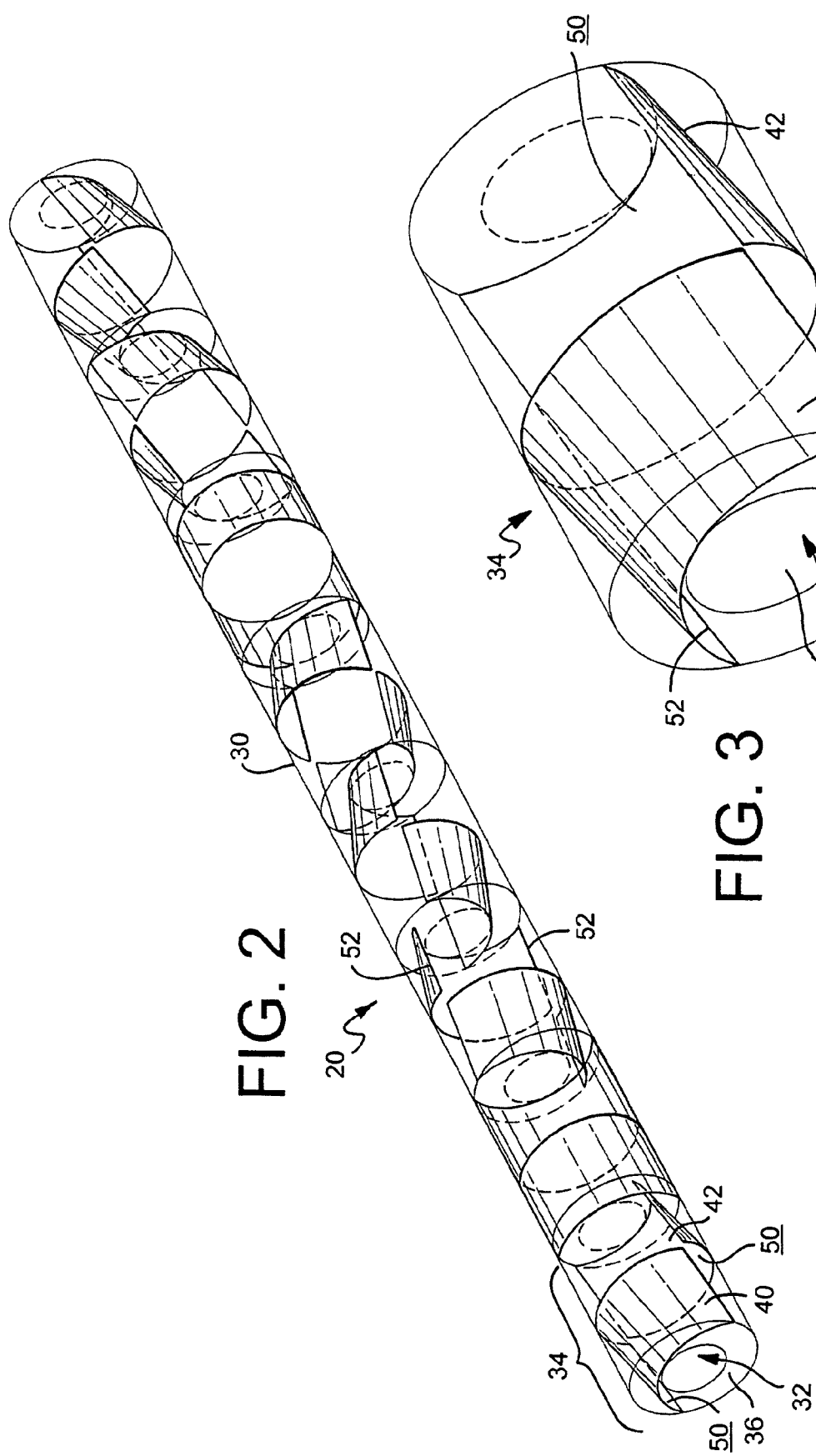

ROTARY PROCESSOR

BACKGROUND OF THE INVENTION

Polymer resins are molded into a variety of useful products. One such polymer resin is polyethylene terephthalate (PET) resin. It is well known that aromatic polyester resins, particularly PET, copolymers of terephthalic acid with lower proportions of isophthalic acid and polybutylene terephthalate are used in the production of beverage containers, films, fibers, packages and tire cord. U.S. Pat. No. 4,064,112 discloses a solid-state polycondensation or polymerization (SSP) process for the production of PET resins.

While for fibers and films the intrinsic viscosity (IV) of the resin must generally be between 0.6 to 0.75 dl/g, higher values are necessary for molding materials such as containers and tire cord. Higher intrinsic viscosity such as greater than 0.75 dl/g can be obtained directly through polycondensation of molten PET, commonly called the melt phase process but only with great difficulty and degradation of the product due to the high shear required to move the increasingly viscous melt. The SSP process is a practical and widely practiced technique to drive polymerization to a higher degree and increase the molecular weight of the polymer by the heating and removal of reaction products while in the form of granules or chips. The polymer with a higher molecular weight has greater mechanical strength and other properties useful for production of containers, fibers and films, for example.

An SSP process starts with polymer chips that are in an amorphous state. U.S. Pat. No. 4,064,112 teaches crystallizing and heating the chips in a crystallizer vessel under agitation to a density of 1.403 to 1.415 $g/cm^3$ and a temperature ranging between 230° and 245° C. (446° and 473° F.) before entering into the SSP reactor. Otherwise the tacky chips tend to stick together during the polymerization process. Various reactions occur during polycondensation of PET. The main reactions that increase the molecular weight of PET is the elimination of either ethylene glycol or water:

1. PET-COO—$CH_2$—$CH_2$—OH+HO—$CH_2$—$CH_2$—OOC-PET→PET-COO—$CH_2$—$CH_2$—OOC-PET+ HO—$CH_2$—$CH_2$—OH
2. PET-COOH+HO—$CH_2$—$CH_2$—OOC-PET→PET-COO—$CH_2$—$CH_2$—OOC-PET+$H_2O$

An inert gas such as nitrogen is run through the polymerization reactor to strip the developing polymer of impurities. The impurities present in the inert gas stream used in the production of polyethylene terephthalate in an SSP process generally include water and organics such as aldehydes and glycols, typically acetaldehyde, ethylene glycol and glycol oligomers. Also, volatile impurities include low molecular weight PET oligomers, such as the cyclic trimer of PET and other oligomers. Water and ethylene glycol are removed from the inert gaseous stream before it is recycled to the SSP because these materials can reverse the polymerization reaction. All impurities are removed to strengthen the polymer product and to assure that they do not taint the compatibility of the end product with its use. Especially important is the prevention of organic impurities from leaching out of a resin container into the beverage contents. These impurities are stripped from polymer chips and accumulate in the inert gaseous stream. An example of a particularly noxious impurity is acetaldehyde which may be created in trace quantities from the thermal breakdown of end groups of the polymer. Acetaldehyde has an objectionable taste in sensitive commodities such as mineral water and must be removed to typically less than 2 ppm or it will migrate into the food at levels that can be detected by the consumer. The organic impurities are present in the inert gaseous stream leaving the solid stating reaction, in quantities, defined as methane equivalent, of about 2000 to 3000 ppm or more. U.S. Pat. No. 5,708,124 discloses maintaining the ratio of inert gas mass flow rate to PET polymer solids mass flow rate to below 0.6 in an SSP reactor.

It is also well known that polyamide resins, and among them particularly PA-6, PA-6,6, PA-11, PA-12 and their copolymers, find wide application both in the fiber and flexible packaging sectors, and in the manufactured articles produced by blow and extrusion technology. While the resin relative viscosity for fibers is low at about 2.4 to 3.0, higher relative viscosities of 3.2 to 5.0 are needed for articles produced by blow and extrusion technologies. The relative viscosity is increased to above 3.0 by means of an SSP process operating at temperatures of between 140° and 230° C. (284° and 446° F.), depending on the polyamide types used. U.S. Pat. No. 4,460,762 describes an SSP process for a polyamide and different methods to accelerate this reaction.

An SSP process for polyamide resins is also described in the article "Nylon 6 Polymerization in the Solid State," R. J. Gaymans et al., JOURNAL OF APPLIED POLYMER SCIENCE, Vol. 27, 2513-2526 (1982) which discloses the use of nitrogen as a heating and flushing aid. The reaction is carried out at 145° C. (293° F.).

It is also known that the molecular weight of polycarbonate can be increased through an SSP process. Developing polyamides and polycarbonates also emit organic impurities that must be purged by an inert gas stream that must then be purified.

The SSP process requires that a steady, uninterrupted flow of polymer chips be maintained through the SSP plant. Sticking of polymer chips should be minimized to ensure a smooth flow of chips during the entire SSP process. To this end, the SSP process requires a suitable combination of reactor residence time and temperature of chips to achieve the desired IV while maintaining a desired flow of chips through the plant. Since the reaction rate increases with increasing temperature, and IV increases with increasing residence time, the desired IV can be attained either by a combination of a relatively long residence time with relatively low temperature or the combination of a relatively short residence time with relatively high temperature. However, there are practical limits to the temperature range. Below 190° C., for typical PET copolymers, the reaction rate is quite slow. At a temperature approximately 10° to 30° C. below its ultimate melting temperature, the PET resin begins to greatly soften and must be kept well-agitated or sticking will occur.

It is desirable that the polymer chips obtained in an SSP process have a narrow IV distribution to achieve a narrow molecular weight distribution in the final product. To this end, the flow regime of polymer chips under processing in an SSP plant should be as close as possible to the ideal "plug flow" behavior, in a way that all polymer chips passing through the reactor experience the same process conditions for the same time duration.

The stickiness of the polymer chips is primarily affected by temperature, chip size, reactor height, velocity of flow of chips through the reactor and polymer crystalline morphology. The polymer chips initially moving freely in a moving bed can stick and clot if, for instance, the temperature or bed height is increased or if the rate is decreased. At solid phase polymerization conditions, polyester is only partially crystalline (typically with 25 to 65% crystallinity). As a consequence, such polyester is not a rigid body, but rather, it is leathery and slightly tacky. Since the tackiness of a polymer chip increases with increasing temperature, the sticking tendency of polymer chips also increases with increasing temperature. In a fixed bed of polyester granules held motionless or moving very slowly inside a vertical, cylindrical reactor at polymerization temperatures and under a consolidating pressure due to the weight of the polymer bed, the chips to be polymerized creep into one another at contact points and, in time, the polymer chips will tend to agglomerate and form larger lumps. In severe cases, the lumping and agglomeration may cause bridging of the discharge section of the vertical reactor and interruption of flow. The most effective way to prevent lumping is to constantly renew the inter-chip contact areas so that polymer chips do not have an opportunity to creep into one another. This can be achieved by maintaining a constant flow of polymer chips at a sufficiently high velocity.

Further, since the sticking tendency increases with increasing specific surface area (area per unit mass) or, more precisely, with increasing specific contact area of polymer chips, it also increases with decreasing size of the polymer chips. Reducing chip size tends to accelerate the polymerization process while increasing the tendency for the polymer chips to lump. Thus, while processing small size polymer chips the higher sticking tendency is countered by a reduction in processing temperatures, which, in turn, brings the final values of the process rate back to the typical ones for larger size granules processed at a higher temperature.

The average consolidating force exerted on a particle in a vertical silo is a function of the material properties, wall friction and the vessel diameter. The theory is well-known and approximated by Janssen's formula which is summarized by E. B. Pitman in "Forces on bins: The effect of random friction" in PHYSICAL REVIEW E, Vol. 57, No. 3, March 1998. Applying Janssen's formula moving downward from the top level of the solids in the vertical reactor predicts a rise in pressure to an asymptotic value, usually at a distance about two or three vessel diameters, then a leveling off of pressure. The value of the maximum pressure exerted on the particle increases with increasing diameter. For this reason there are practical limits on the height and diameter dimensions of a solid phase polymerization reactor. At sufficiently high flow velocity, polymer chips change their positions relative to each other (by sliding, for example), and the tendency to form lumps is lessened. Since the rate of changes of contact areas of polymer granules and the reduction in the bulk density of the bed increases with increasing chip flow velocity, polymer sticking tendency within the reactor decreases with increasing chip flow velocity.

Accordingly, in a conventional SSP process, there are two primary methods to incrementally increase the product IV; namely, increasing the reactor temperature or increasing the reactor residence time of polymer chips. The reactor residence time is constrained by bed height and diameter and chip flow velocity. It can be increased by either increasing the bed height or by decreasing the chip velocity. Increasing the reactor diameter allows an increase in the flowrate but not in residence time at constant chip velocity. On the other hand, if the reactor temperature is raised to increase the end product IV, polymer sticking tendency will accordingly increase. One method to prevent polymer sticking would be to decrease the bed diameter and accordingly the force on the particles or to increase the chip velocity. However, if one desires to decreases the bed diameter or increase the velocity, the vessel must be made taller and more expensive to achieve the desired holdup time at a particular reaction rate. If one desires to increase the reaction rate by elevating the temperature, the sticking tendency increases. These constraints limit the ability of conventional plants using vertical single or multiple reactors, to increase intrinsic polymer IV.

SUMMARY OF THE INVENTION

The present invention provides an apparatus for increasing the intrinsic viscosity of a polymer. The apparatus includes: (1) a chamber adapted to be rotated about an axis and defining a first radial dimension, the chamber defining an internal volume and an internal surface, the chamber having a first end wall and a second end wall opposed to the first end wall, the first end wall having a first aperture defining a second radial dimension smaller than the first radial dimension, the second end wall having a second aperture, the first and second apertures providing access to the internal volume; (2) a first wall defining the internal volume and extending inwardly from and obliquely to the first end wall, the first wall having a first product contacting surface positioned about a portion of the first aperture; and (3) a second wall defining the internal volume and positioned axially from the first wall along the first axis, the second wall extending inwardly from and obliquely to the second end wall, the second wall having a second product contacting surface positioned about a portion of the second aperture.

The present invention also provides an apparatus for increasing the intrinsic viscosity of a polymer. The apparatus has a chamber defining a first radial dimension and a first axis, the chamber defining an internal volume and an internal surface. The apparatus also has a plurality of separating walls spaced along the first axis and extending axially through the internal volume defining a first number of abutting segments, one segment defined between each of two axially spaced separating walls, each separating wall having an aperture providing access to a portion of the internal volume. The apparatus further includes a motor for rotating the chamber about the first axis.

The invention further provides a process for increasing the intrinsic viscosity of a polymer. The process requires: (1) providing a mass of polymer material having a first intrinsic viscosity; (2) feeding the polymer material into a kiln comprising: (a) a chamber defining a first radial dimension and a first axis, the chamber defining an internal volume and an internal surface, (b) a plurality of separating walls spaced along the first axis and extending axially through the internal volume defining a first number of abutting segments, one segment defined between each two axially spaced separating walls, each separating wall having an aperture providing access to a portion of the internal volume; and (3) rotating the kiln about the first axis to move the polymer mass through the kiln.

These and other aspects and attributes of the present invention will be discussed with reference to the following drawings and accompanying specification.

BRIEF DESCRIPTION OF THE DRAWINGS

FIG. 2 is an isometric view of a rotary kiln.

FIG. 3 is an isometric view of a segment of the rotary kiln.

DETAILED DESCRIPTION OF THE INVENTION

Figure 1:
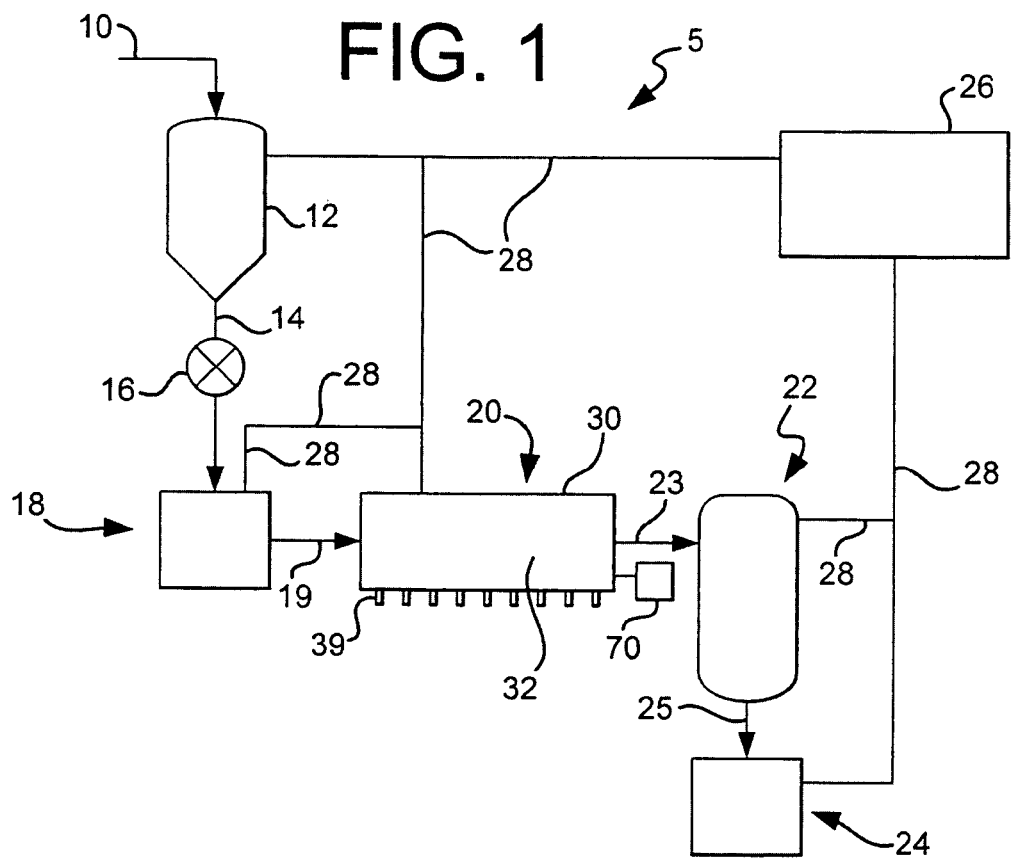
FIG. 1 is a schematic view of a plant for carrying out a solid-state polymerization process.

While this invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

A detailed description of a preferred method of carrying out the process is given in the context of a solid-state polycondensation or polymerization (SSP) process. However, the present invention can be used with other types of polymerization processes, such as for polyamides and polycarbonates, in which impurities are purged from the polymerization with inert gas and the impurities are oxidizable, especially to carbon dioxide and water. Polyester resins usable in the SSP process are products of polycondensation of aromatic bicarboxylic acid, particularly terephthalic acid or its esters with diols with 1 to 12 carbon atoms such as ethylene glycol, 1,4-dimethylolcyclohexane and 1,4-butanediol. Polyethylene terephthalate (PET) and polybutylene terephthalate are the preferred resins. Polyester resins usable in the SSP process also may include elastomeric polyester resins, including segments deriving from polyethylene glycol, and copolyesters containing up to 20% of units deriving from aromatic bicarboxylic acids different from terephthalic acid, such as isophthalic acid. The resins to be subjected to SSP can contain a resin-upgrading additive to accelerate the SSP reaction. The preferred upgrading compounds are the dianhydrides of tetracarboxylic aromatic acids, and particularly pyromellitic dianhydride. The upgrading agent is generally used in a quantity of about 0.05 to 2% by weight. Conventional additives, like stabilizers, dyes, flame retardants and nucleants can also be present in the resin. Polyester resins useful for IV upgrading in SSP processes can also be material produced from recycled containers which have been washed, shredded and dried. Typically, the recycled material is remelted and pelletized before being sent to the SSP process.

Polyamide resins usable in the process of the invention include polyamide 6 derived from caprolactam, polyamide 6,6 obtained from hexamethylenediamine and adipic acid, polyamide 11 obtained from aminoundecanoic acid, and 12 polylaurilacetone copolyamides 6/10 and 10/12 and also polyamides of metaxylene diamine.

Polycarbonates may also be used in the process of the present invention.

Referring to FIG. 1, the polyester SSP process to which the present invention can be applied is carried out in plant 5 and the process comprises feeding starting polyester chips having an intrinsic viscosity lower than the desired IV for the end use. Typically the starting IV ranges from about 0.57 to 0.65 dl/g. The starting chips are fed to a hopper 12 through a line 10. The intrinsic viscosity or molecular weight of the starting material is immaterial to the practice of the invention. Generally, the SSP process can be successfully performed with feeds across a wide range of values. For example, techniques are disclosed for using a starting material having a degree of polymerization as low as 2-40 by U.S. Pat. No. 5,540,868, U.S. Pat. No. 5,633,018, and U.S. Pat. No. 5,744,074 which contemplate eventually undergoing SSP processing to raise the molecular weight sufficient to make useful resins. Also, the starting intrinsic viscosity in the case of post-consumer recycle material can be at levels of above 0.65 dl/g.

The hopper 12 feeds the chips through a line 14 and a control valve 16 to an optional pre-crystallization zone 18, then through line 19 to a rotary processor or kiln 20. If additional polymerization is desired the chips and then fed to an optional reactor 22 through a line 23 and the polymerization may be quenched in a product cooling or quenching station 24 in chip flow communication through line 25. A gas purification and pumping system 26 is connected to the various vessels and components of the plant 5 through lines 28. However, it is envisioned that all crystallization and polymerization be achieved in the rotary kiln 20 without need for the pre-crystallization zone 18 or the reactor 22.

The hopper 12 is of conventional design having a cone angle to promote plug flow and feeds polymer chips to line 14 by the force of gravity.

The pre-crystallization zone is optional. It can be external to the rotary kiln 20 or mounted to the rotary kiln 20. The pre-crystallization zone is desirable because of the severe exothermic nature of primary crystallization of PET. The full heat of crystallization of PET is 120 J/g. In going from fully amorphous PET to 35% crystallization, 42 J/g of heat is released. This process takes less than two minutes as measured by differential scanning calorimetry (DSC). This heat if removed by gas contact requires a high degree of agitation of the heated chips. Thus, it is desirable that the crystallization be carried out in discrete, sequential steps first utilizing a pre-crystallization zone followed by further crystallization in the rotary kiln 20.

The pre-crystallization can be carried out in numerous known techniques external to the rotary kiln 20 such as by utilizing a back mixed fluidized bed, a simple fluidized bed or a process in which underwater granulation is employed with self-heating of the chips to accomplish primary crystallization as disclosed in WO 00/23497 A1.

In a preferred form of the pre-crystallization zone, a backmixed fluid bed 18 is utilized. The backmixed fluid bed 18 has a mass flow controlling feeder which receives amorphous chips from the hopper and feeds them to a premix vessel. The premix vessel mixes feed stock with partially crystallized and heated chips from the pre-crystallizing chamber 18. In a preferred form, the backmixed fluid bed utilizes back mixing devices such as rakes or blades which promote back mixing to blend recycled chips with feed chips in a ratio from 5:1 to 40:1, more preferably from 10:1 to 30:1 and most preferably from 10:1 to 20:1.

Turning to FIGS. 2 and 3, the rotary kiln 20 has a horizontally extending, and preferably generally cylindrical outer wall 30 defining a chamber 32 and having a first radial dimension 33 and an axis of rotation 35. In a preferred form of the rotary kiln, the axis of rotation is parallel to a horizontal line or could form an acute angle with the horizontal line such as from 1° to 20°. FIG. 2 shows the chamber 32 is divided into a sequence of adjacent segments 34 by axially arranged and radially extending separating walls 36. The separating walls 36 extend through an internal volume of the chamber 32 defining a segment (See FIGS. 3-7) between each of two adjacent separating walls 36.

Each separating wall 36 has an aperture 38. In a preferred form, the aperture 38 is centrally disposed on each separating wall 36 and is in alignment with the other apertures. The aperture 38 can have numerous shapes such as circular, oval or polygonal and most preferably is generally circular in shape. The peripheral edges of the aperture can have a beveled edge or knife edge if desired. It is also preferable the apertures 38 be positioned coaxially about the axis of rotation of the cylindrical outer wall 30. The aperture 38 has a second radial dimension 39. The first radial dimension should have a ratio with respect to the second radial dimension of from 1:0.9 to 1:0.1. The rotary kiln 20 is shown having eight segments but a fewer or a greater number of segments could be utilized without departing from the scope of the present invention.

FIG. 1 also shows a series of knife gate valves 39 one of each associated with each segment 34. The knife gate valves 39 allow for emptying of the kiln upon plant shutdown. The knife gate valves 39 have slide gates which close off small drain holes in the cylindrical wall 30. The drain holes are preferably arranged such that the edge of the hole is even with the cylindrical outer wall 30. The gate valves are opened sequentially to drain the contents of each segment.

Figure 4:
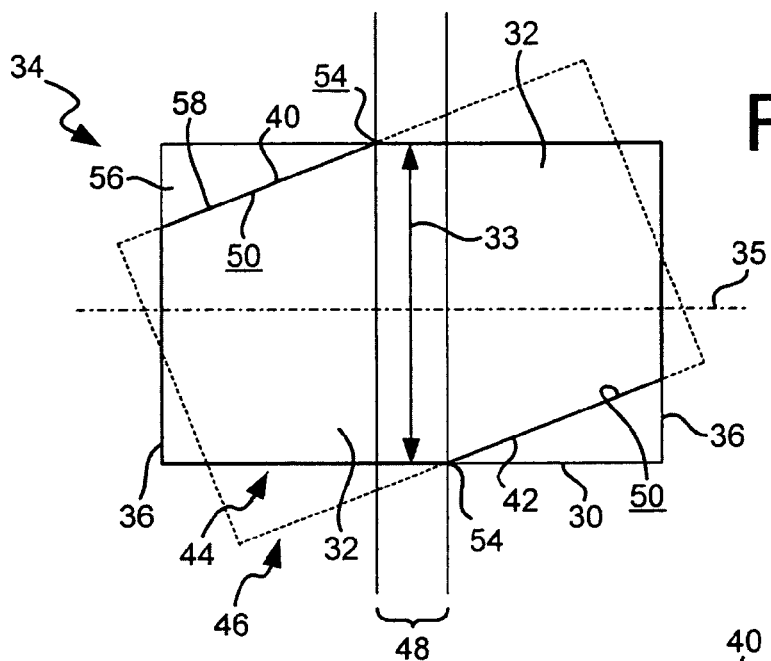
FIG. 4 is a side elevational view of a segment the rotary kiln.
Figure 5:
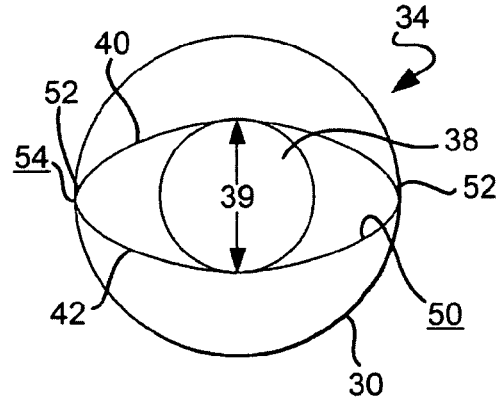
FIG. 5 is an end view of the segment of FIG. 4.
Figure 6:
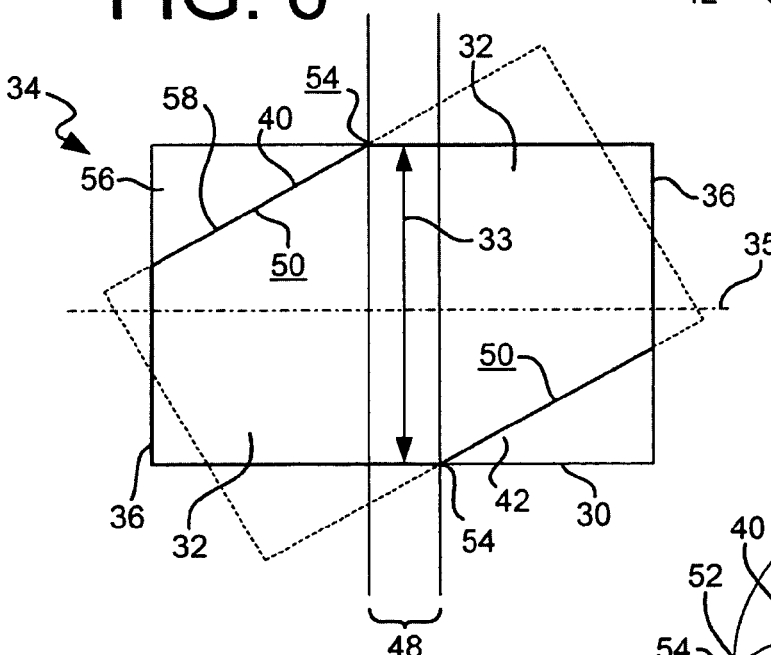
FIG. 6 is a side elevational view of a segment of the rotary kiln.
Figure 7:
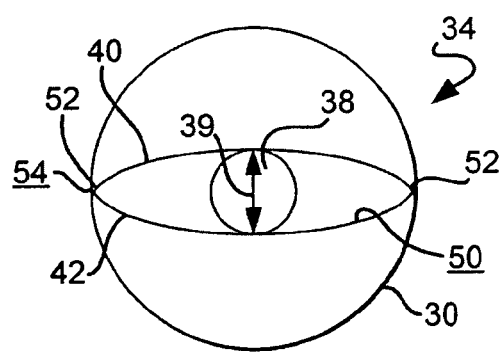
FIG. 7 is an end view of the segment of FIG. 6.

In a preferred form of the rotary kiln 20, an optional wall 40 extends inwardly from and obliquely to at least one of the separating walls of each segment. Even more preferably, each segment has an optional first wall and a second wall 40, 42 one of each extending from opposed separating walls 36 extending inwardly from and obliquely to the separating wall. As shown in FIGS. 4 and 6 the segment 34 may be defined by an intersection solid formed by a first cylinder 44 and a second imaginary cylinder 46 (shown in phantom) which is rotated counterclockwise about the center. The first wall and the second wall 40, 42 should extend at an angle to the axis of rotation of the first cylinder from about 10° to about 80°, more preferably from 20° to 60° and most preferably from 20° to 45°. FIGS. 4 and 5 show the second cylinder at a 20° incline to the axis of rotation and FIGS. 6 and 7 show the second cylinder at a 30° incline to the axis of rotation. While an axial gap 48 is shown between a distal end of the first wall and the distal end of the second wall the gap is optional.

The first wall and the second wall 40 and 42 each have a product contacting surface 50. The product contacting surface 50 can be flat or curved, convex or concave, and in a preferred form is hemi-cylindrical in shape and concaved. Also, the product contacting surface 50 should extend from the separating wall 36 to an inner portion of the cylindrical wall 30 and preferably not extend across the aperture 38. The product contacting surfaces 50 have opposed lateral edges 52 and each lateral edge preferably contacts an inner surface 54 of the outer cylindrical wall 30. In one preferred form, a chord extended between the opposed lateral edges 52 may have a length essentially equal to the first radial dimension. In a preferred form, the first wall 40 and or the second wall 42 will have a portion that abuts an outer circumference of the aperture 38 or be in close proximity thereto. A volume 56 of the rotary kiln 20 located between the respective product contacting surface 50 and the outer cylindrical wall 30 can be empty or filled with insulation. It is also contemplated that the outer cylindrical wall 30 for each segment can have other configurations such as an optional, centrally located cylindrical portion and tapering end portions defined by an opposite surface 58 of the product contacting surface to define a cylinder truncated at both ends. Thus, the outer cylindrical wall 30 does not have to have a constant outer diameter across its entire length and can be partially removed such that the device has no unused internal volume that is not exposed to the material to be processed.

FIGS. 2 and 3 show that the product contacting surfaces 50 of the first wall and the second wall 40 and 42 are positioned in opposite halves of the internal volume and are oriented with respect to one another by a phase angle of 180° about the axis of rotation. However, it is contemplated the phase angle can be from 30° to 180°. In a preferred form of the invention, each segment should have a ratio of length to the first radial dimension of from 1:1 to 5:1, and more preferably from 1.5:1 to 3:1.

FIG. 2 shows eight segments 34 adjacent and attached to one another to form the rotary kiln 20. In a preferred form, each segment, after the first segment, along the length of the rotary kiln 20 is oriented by a second phase angle rotated about the axis of rotation with respect to its preceding segment. In a preferred form of the invention, the second phase angle is determined by dividing 360° by the number of segments. Thus, in one preferred form, the second phase angle is 45° so the second segment is oriented 45° with respect to the first segment and the third segment is oriented at a 90° angle with respect to the first segment and so on down the kiln. It is contemplated the second phase angle can be from 10° (36 segments) to 180° (two segments).

It is contemplated that a single separating wall 36 could be used between segments instead of two separating walls 36 abutting one another in adjacent segments. It is also contemplated that adjacent segments could be spaced from one another with a linking segment that connects the aperture 36 of one segment with the aperture 36 of a second adjacent segment. The linking segment could be cylindrical in shape or other shape provided it provides a pathway for conveying polymer chips between adjacent segments.

The rotary kiln 20 is mounted for rotational movement about the axis of rotation of the cylindrical wall 30. There are several approaches known in the art for supporting and rotating a rotary kiln. Usually there are provided one or more axially spaced metal tires (not shown) attached to an outer surface of the cylindrical chamber 30 about a circumferential portion thereof. The rotary kiln 20 is then supported along its length by resting these tires on roller supports. The kiln 20 is rotated by a motor 70 through one or more ring gears (not shown) which may be welded to the outer wall 30. Upon rotation of the rotary kiln 20 there is a gentle agitation of the polymer chips and a tumbling action. Further, there is a fold-in of chips from a preceding compartment to a subsequent one, so that it is not likely for the chips to short-circuit the bed. In this way, the solids residence time in the kiln is that of tanks in series, where the number of tanks is equal to the number of segments. Further, the sequential arrangement of the segments allows the chips to tumble, but no violent eccentric mechanical forces are transmitted to the supports or drive gear.

The PET chips exiting the rotary kiln will typically have an intrinsic viscosity from 0.6-1.2 dl/g depending on the application (e.g., 0.70-0.86 dl/g for containers, 0.9-1.2 dl/g for technical fibers). The resins leaving the rotary kiln 20 may be conveyed horizontally to a vertical silo or hopper reactor or more than one hopper reactor for continuation of the increase of intrinsic viscosity. Preferably, the exiting resin chips may be conveyed directly to the product cooler 24 if sufficient IV lift is achieved in the rotary kiln 20. By mounting the rotary kiln 20 horizontally or at a slight angle to the horizontal, the entire plant 5 for carrying out the SSP process can have a lower height when compared to other prior art plants. It is also contemplated the chips can be conveyed from the rotary kiln upwardly to the vertical single or multiple reactors. This would be done by pneumatic dense or dilute-phase conveying such as is well-known in the industry. In this way, the kiln 20 is located at or near ground level for ease of maintenance and proper foundation.

Figure 8:
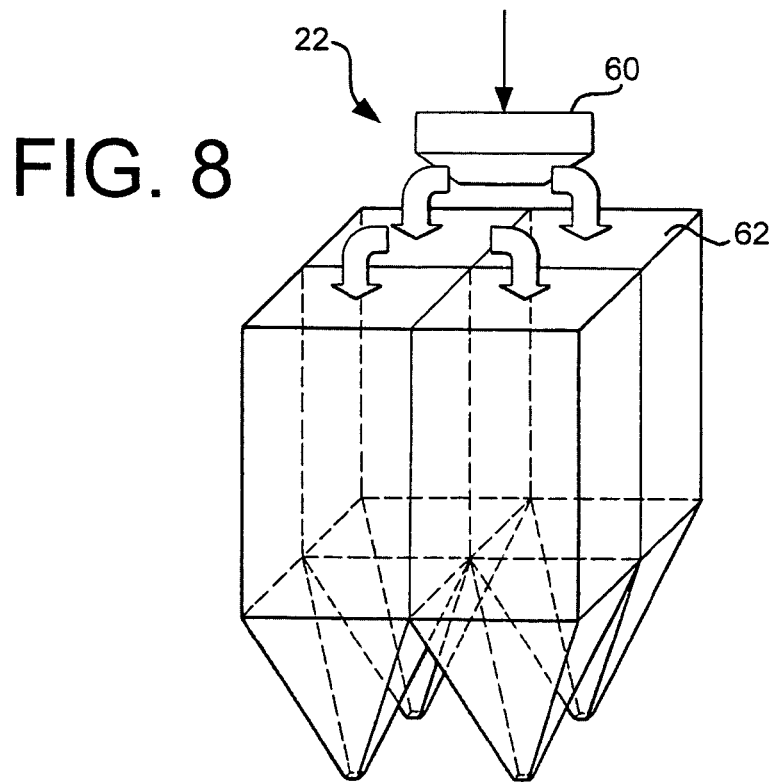
FIG. 8 is a schematic view of a reactor having multiple reactor hoppers.

FIG. 8 shows one preferred form of the reactor 22 having a flow splitter 60 dividing a flow of chips into four vertically extending reactor hoppers 62. The reactor hoppers 62 are shown having a square cross-sectional shape but this shape is not critical to the design of the hoppers 62. The hoppers 62 could have a circular, oval, polygonal or irregular shape provided that plug flow of the solids is maintained through vertical sections of the hoppers. The discharge end of the hoppers is shown having a square-pyramidal shape, but this shape can be any form for which even plug flow is maintained. For example, conical or elliptical-conical, stepped and other types are well-known in the industry.

The flow splitter 60 can be a box type or consist of a tube with a stepping actuator which diverts flow from one hopper to the next in a programmed way so as to ensure equivalent flow rate, and, therefore, the same hold-up time in each hopper.

The gas purification and pumping system 26 typically provides hot dry nitrogen to plant 5 and particularly to the kiln 20 via line 28 for the removal of impurities and cooled nitrogen to a product cooler 24. The gas flow can be counter-current or co-current to the flow of solids through the plant 5. The gas flow system 26 is optional, in some cases where flow rates are small, dry nitrogen is used in a once-through manner and discharged to atmosphere or a pollution control device. Further, in some cases, the system is subjected to a partial vacuum with or without some small amount of sweeping gas and in this case the impurities are removed by direct evacuation from the plant.

The gas purification and pumping system 26 provides heated gas, cooling gas, purified gas throughout the plant 5 for the removal of impurities and the like. The gas flow can be counter-current or co-current to the flow of solids through the plant 5. The gas flow system 26 can be an opened or a closed system depending on the volume of nitrogen gas utilized.

Heated gas flows can be achieved using heat exchange units, gas delivery lines and recycle lines as is well known in the art to operate the various vessels in the plant at the desired temperature. Similarly, cooling gas flows can be similarly provided to the product cooler 24 or elsewhere as needed.

EXAMPLE 1

A rotary kiln processor has seven segments arranged sequentially with each segment emptying directly to the subsequent compartment. The angle of the rotary kiln processor was downwardly inclined at least 1° from the horizontal and preferably about 5°, to provide smooth flow without back-mixing between segments.

Each segment has a length of 3.7 m (12 ft) and a diameter of 2.4 m (8 ft), thus 1.5 L/D ratio. Each segment has its two internal opposed walls as depicted by 40 and 42 in FIG. 4 extending inwardly from and obliquely to opposed separating walls at an angle of 30° to the horizontal axis of the rotary kiln 20. The solids holdup volume of a single segment, as defined as the level to which the solids will overflow through the aperture 38 into the next segment when the segment is horizontal is 4.1 m³ (144 ft³). The volumetric efficiency (solids holdup/volume of empty drum) is 24% wherein the term "empty drum" assumes the optional internal walls 40 and 42 were removed to make a cylinder.

A polyethylene terephthalate-isophthalate copolyester having intrinsic viscosity of 0.58 dl/g is required to be upgraded to 0.80 dl/g for use as a material for stretch blow molding of containers. The plant throughput is 55 MT/d and the reactivity of the polymer in units of delta IV/hr (velocity of polymerization) is 0.030 as measured by a laboratory test at 225° C. in flowing nitrogen. The bed density of the tumbling chips is estimated by knowing the particle density and the approximate voidage in the tumbling state, from having made measurements in bins on weigh devices. From this voidage, it can be determined that the holdup volume required for the upgrading is 20.39 m³, which is satisfied by five compartments in series.

TABLE

|  | Units |  |
|---|---|---|
| Assumed piece density of PET chips | kg/m³ | 1360 |
| Assumed tumbling voidage of PET chips |  | 0.39 |
| Reactivity of PET copolymer at 225° C. | dl/g/hr | 0.03 |
| Required IV lift | dl/g/hr | 0.22 |
| Throughput | MT/d | 55.3549 |
| Cell volume | ft³ | 144 |
| Bulk density of PET in processor | kg/m³ | 829.60 |
| Holdup time required for IV lift | hr | 7.33 |
| Holdup volume required | m³ | 20.39 |
| Cell volume | m³ | 4.08 |
| Number of cells required |  | 5.00 |
| total length | ft | 60.00 |
| total length | M | 18.3 |
| Diameter | M | 2.44 |
| Overall L/d |  | 7.50 |

The table shows sufficient holdup is achieved in a rotary kiln rector of the present invention to enable sufficient increase to 0.80 IV without need of a further vertical reactor.

The spectrum of residence time for such a device can be estimated by a "tanks in series" model such as that outlined by Hans-Juergen Henzler in Chapter 7 "Continuous Mixing of Fluids" in Ullmann's ENCYCLOPEDIA OF INDUSTRIAL CHEMISTRY, 7th (2002: Wiley). It can be seen from this reference that by using at least five and more preferably seven segments in series, a relatively symmetrical distribution can be achieved. A symmetrical distribution is desirable as it is important in achieving a consistent age distribution of polymer leaving the rotary kiln processor. Ideally, this age distribution is such to cause a product molecular weight distribution less than or equal to the usual distribution of molecular weight in condensation polymers, namely a polydispersity (MWn/MWw)=2.0 where MWn and MWw are the number and weight-averaged molecular weights respectively. If this is accomplished, the polyester resin is of consistent quality and processability for all end uses.

EXAMPLE 2

A polyethylene terephthalate-isophthalate copolyester having intrinsic viscosity of 0.58 dl/g was required to be upgraded to 0.80 dl/g for use as a material for stretch blow molding of containers. The plant throughput is 390 MT/d and the reactivity of the polymer in units of delta IV/hr (velocity of polymerization) is 0.030 at 225° C. and 0.025 at 220° C. as measured by a laboratory test in flowing nitrogen. The bed density of the chips is the same as the previous example.

A rotary kiln processor has eight segments each of the same length, diameter and internal geometry as the previous example. The eight compartments arranged sequentially have a bed effective volume of 32.6 M³, corresponding to an average holdup time of 1.67 hours at the given throughput. The chips are tumbled at 225° C. in flowing nitrogen.

At the discharge of the processor, the chips enter a dense phase conveying system, where through the action of the lifting gas, they are cooled by 5° C. to 220° C. Upon discharging, a rotating selector valve alternately discharges equivalent batches of partially upgraded chips to a battery of four cylindrical silos having diameter of 2 meters and working length of 10.6 meters. Flowing nitrogen is injected to the bottom of each silo at an effective gas/solid weight ratio of 0.2 to 0.5 kg/kg. The average bed temperature in the silos is approximately constant at 225° C. At the discharge of each silo is a rotary feeder which operates to keep each silo at constant level. Combined fully-upgraded chips from the silos are discharged to a chips cooler. The effective total volume of the silos is 133 $M^3$, giving a holdup time of 6.8 hours, which at the measured reactivity is sufficient to complete the IV upgrading requirement. In this example, 20% of the necessary holdup time is supplied by the kiln processor and the remaining 80% by the silos. Unlike conventional processes, the process described in this example requires a building of only modest height to accommodate the battery of vertical silos. Further, the height of the conveying system is minimized, therefore needing less convey gas and pressure drop. Further, the improved process of this example is able to execute grade changes quickly and easily, since the selector is able to bypass one or more silos to reduce the total plant holdup by increments of 20%.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. An apparatus for increasing the intrinsic viscosity of a polymer comprising:
   a chamber adapted to be rotated about an axis and defining a first radial dimension, the chamber defining an internal volume and an internal surface, the chamber having a first end wall and a second end wall opposed to the first end wall, the first end wall having a first aperture defining a second radial dimension smaller than the first radial dimension, the second end wall having a second aperture, the first and second apertures providing access to the internal volume;
   a first wall having a first end abutting the first end wall, the first wall further defining the internal volume and extending inwardly from and obliquely to the first end wall, the first wall having a distal end spaced axially apart from the second end wall, the first wall defining a first product contacting surface positioned about a portion of the first aperture; and
   a second wall having a first end abutting the second end wall, the second wall further defining the internal volume and extending inwardly from and obliquely to the second end wall, the second wall having a distal end located axially between the second end wall and the distal end of the first wall, the second wall having a second product contacting surface positioned about a portion of the second aperture.

2. The apparatus of claim 1 further comprising a third wall defining the internal volume and encompassing the first wall and the second wall.

3. The apparatus of claim 2 wherein the third wall is elongate and has a generally circular-shaped cross section.

4. The apparatus of claim 2 wherein the first wall further comprises opposed first and second lateral edges, the first and second lateral edges contacting the third wall.

5. The apparatus of claim 1 further including a motor for rotating said chamber.

6. The apparatus of claim 1 wherein the first and second apertures are concentrically disposed about the axis.

7. The apparatus of claim 1 wherein the first product contacting surface is generally flat.

8. The apparatus of claim 1 wherein the first product contacting surface is generally curved.

9. The apparatus of claim 8 wherein the first product contacting surface is generally hemi-cylindrical in shape.

10. The apparatus of claim 1 wherein the first wall forms an angle with the first end wall from 15° to 55°.

11. The apparatus of claim 10 wherein the second product contacting surface is positioned by a phase angle rotated about the axis from the first product contacting surface.

12. The apparatus of claim 1 wherein the distal end of the first wall and the distal end of the second wall are axially spaced apart.

13. The apparatus of claim 1 wherein the distal end of the first wall and the distal end of the second wall abut an imaginary plane that is perpendicular to the axis.

14. The apparatus of claim 1 wherein the first end of the first wall is radially closer to the axis than the distal end of the first wall.

15. An apparatus for increasing the intrinsic viscosity of a polymer comprising:
   a chamber defining a first radial dimension and an axis, the chamber defining an internal volume and an internal surface;
   at least three separating walls, each separating wall having an aperture providing access to a portion of the internal volume, the separating walls spaced along the axis and extending radially to the internal surface; and
   a segment being a portion of the internal volume located between axially adjacent first and second separating walls, the segment further comprising a first wall extending inwardly from and obliquely to the first separating wall and having a first product contacting surface, the first wall further defining the portion of the internal volume located between axially adjacent first and second separating walls;
   wherein the apparatus comprises at least a first segment and a second segment, the second segment rotated about the axis relative to the first segment by a first phase angle.

16. The apparatus of claim 15 wherein the segment further comprises a second wall further defining the internal volume and extending inwardly from and obliquely to the second separating wall and having a second product contacting surface.

17. The apparatus of claim 15 wherein the separating wall apertures are concentrically disposed about the axis.

18. The apparatus of claim 15 wherein at least two segments abut each other.

19. The apparatus of claim 15 wherein the number of segments is N and axially adjacent segments are positioned rotated about the axis relative to each other by a phase angle of 360° divided by N.

20. An apparatus for increasing the intrinsic viscosity of a polymer comprising:
   a chamber defining a first radial dimension and an axis, the chamber defining an internal volume and an internal surface;
   at least three separating walls, each separating wall having an aperture providing access to a portion of the internal volume, the separating walls spaced along the axis and extending radially to the internal surface; and
   a segment being a portion of the internal volume located between axially adjacent first and second separating walls, the segment further comprising:
   a first wall having a first end abutting the first separating wall and extending inwardly from and obliquely to the first separating wall, the first wall having a distal end spaced axially apart from the second separating wall, the first wall defining a first product contacting surface and further defining the portion of the internal volume located between axially adjacent first and second separating walls;

a second wall having a first end abutting the second separating wall and extending inwardly from and obliquely to the second separating wall, the second wall having a distal end located between the second separating wall and the distal end of the first wall, the second wall defining a second product contacting surface and further defining the portion of the internal volume located between axially adjacent first and second separating walls;

wherein the apparatus comprises at least a first segment and a second segment, the second segment rotated about the axis relative to the first segment by a first phase angle.

* * * * *

UNITED STATES PATENT AND TRADEMARK OFFICE
CERTIFICATE OF CORRECTION

PATENT NO. : 7,585,104 B2
APPLICATION NO. : 11/224176
DATED : September 8, 2009
INVENTOR(S) : James F. McGehee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 935 days.

Signed and Sealed this

Fourteenth Day of September, 2010

David J. Kappos
*Director of the United States Patent and Trademark Office*